(12) United States Patent
Kanda et al.

(10) Patent No.: US 6,570,661 B2
(45) Date of Patent: May 27, 2003

(54) OPTICAL SYSTEM FOR OBLIQUE INCIDENCE INTERFEROMETER AND APPARATUS USING THE SAME

(75) Inventors: Hideo Kanda, Omiya (JP); Fumio Watanabe, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 255 days.

(21) Appl. No.: 09/737,753

(22) Filed: Dec. 18, 2000

(65) Prior Publication Data

US 2001/0007502 A1 Jul. 12, 2001

(30) Foreign Application Priority Data

Jan. 11, 2000 (JP) ........................................ 2000-002626

(51) Int. Cl.[7] .................................................. G01B 9/02
(52) U.S. Cl. ..................................................... 356/512
(58) Field of Search .............................. 356/512, 514, 356/511, 513

(56) References Cited

U.S. PATENT DOCUMENTS

| | | | | | |
|---|---|---|---|---|---|
| 4,072,423 A | * | 2/1978 | Kimura et al. | ............... | 356/512 |
| 4,325,637 A | * | 4/1982 | Moore | ........................ | 356/512 |
| 4,859,061 A | * | 8/1989 | Inoue | ......................... | 356/512 |
| 6,501,552 B1 | * | 12/2002 | Mizuno | ....................... | 356/512 |

* cited by examiner

Primary Examiner—Samuel A. Turner
Assistant Examiner—Michael A. Lyons
(74) Attorney, Agent, or Firm—Snider & Associates; Ronald R. Snider

(57) ABSTRACT

In an interferometer optical system comprising a reference standard having an entrance surface on which a luminous flux from a light source is incident and a reference plane on which the luminous flux entering from the entrance surface is obliquely incident, an angle within the range of 10° to 30° is formed between the entrance surface and reference plane of the reference standard.

7 Claims, 7 Drawing Sheets

OPTICAL SYSTEM FOR OBLIQUE INCIDENCE INTERFEROMETER AND APPARATUS USING THE SAME

RELATED APPLICATIONS

This application claims the priority of Japanese Patent Application No. 2000-002626 filed on Jan. 11, 2000, which is incorporated herein by reference.

BACKGROUND OF THE INVENTION

1. Field of the Invention

The present invention relates to an optical system for an interferometer which measures the planarity of a sample surface by utilizing interference fringes formed by interfering actions of light; and, more specifically, to an optical system employed in an oblique incidence interferometer which can measure the planarity of a rough surface, in particular, in a noncontact fashion by obliquely irradiating a reference plane and a sample surface with light, and an apparatus using the same.

2. Description of the Prior Art

Various interferometer apparatus have conventionally been known for measuring the planarity of surfaces of processed products. Among them, oblique incidence interferometer apparatus have been known as an apparatus which can measure the planarity of sample surfaces having a large difference in surface level.

Since the measurement sensitivity can be set low by making a coherent luminous flux obliquely incident on a sample surface, the oblique incidence interferometer apparatus have been in use for measuring the planarity of rough surfaces and the like in a noncontact fashion. Here, letting $\lambda$ be the wavelength of light used for measurement, and $\theta$ be the incident angle of light incident on the entrance surface of a reference standard, the amount of unevenness of the sample surface, i.e., the measurement sensitivity $\Delta h$, is represented by the following expression:

$$\Delta h = \lambda/(2\cos\theta)$$

Namely, as the incident angle $\theta$ increases, so that the degree of oblique incidence is greater, the fringe interval increases, so that the measurement sensitivity can be lowered, whereby surfaces with a lower planar precision can be measured.

FIG. 5 shows a conventional configurational example using a planar reference plate as a reference standard. This oblique incidence interferometer apparatus is configured such that a reference plane 116a of a plane-parallel plate 116 and a sample surface 2a of a sample 2 are disposed so as to face each other, the reference plane 116a is obliquely irradiated with coherent light which is turned into parallel rays by a collimator lens 114 after being emitted from a laser light source 111, and interference fringes corresponding to the optical path difference based on the distance between the reference plane 116a and the sample surface 2a are projected onto a screen 118, so as to be viewed by an observer 119. The principle of generating interference fringes is shown in FIG. 7A. Namely, of a parallel luminous flux incident on a reference plane 6a from the upper left side of the paper surface, a part is emitted from the reference plane 6a so as to be made obliquely incident on the sample surface 2a, and then is reflected by the sample surface 2a so as to be made incident on the reference plane 6a again, thereby optically interfering with the luminous flux internally reflected by the reference plane 6a, thus generating interference fringes.

In this configuration, however, interference noise such as that shown in FIG. 7B is likely to occur. This interference noise is caused by light reflected by a surface (which is the entrance surface and exit surface) of the planar plate other than the reference plane, and is eliminated to a certain extent if this surface is provided with an antireflection coating. Since the incidence angle is large, however, a coating having a low reflectance is hard to apply.

FIG. 6 shows a conventional configurational example known as Abramson type using a rectangular equilateral triangle prism as a reference standard. In FIG. 6, members similar to those in the oblique incidence interferometer shown in FIG. 5 are referred to with numerals having two lower digits identical to those of their corresponding members in FIG. 5. This apparatus is configured such that interference fringes projected onto a screen 218 are captured by a TV camera 219, so as to be viewed. This Abramson type apparatus can prevent interference noise from occurring due to a surface reflection such as that shown in FIG. 7B.

However, a problem of interference noise caused by multiple reflection light between the sample surface and reference plane remains as shown in FIG. 7C. For eliminating this problem, the apparatus must be configured such that light reflected in a multiple fashion between the sample surface and reference plane is prevented from interfering with the light internally reflected by the reference plane and thereby reaching the screen surface. An example of techniques effective in eliminating this problem with a relative arrangement of optical members is one in which the reference plane is set to a size which is at least twice as large as that of the sample surface. This conventional configurational example using a rectangular equilateral triangle prism is problematic in that the prism itself becomes very large and heavy in order to make the reference plane greater.

While the luminous flux directed from the collimator lens to the sample surface must cover the parts of incident light onto the sample surface and reference light, a parallel luminous flux having a large luminous flux diameter is needed to be made incident in this conventional configurational example using the rectangular equilateral triangle prism, since the incident angle with respect to the entrance surface of prism is small. It is problematic in that the collimator lens also becomes greater, whereby the interferometer as a whole enhances its size.

Further, there is a problem that the luminous flux internally reflected by the reference plane of prism is emitted in the same direction as interference light, so that the noise based on this internally reflected light is superimposed on the screen.

SUMMARY OF THE INVENTION

In view of such circumstances, it is an object of the present invention to provide an oblique incidence interferometer optical system which can make the optical system smaller and can reduce the weight and size of an interferometer apparatus while lowering interference noise in an oblique incidence interferometer yielding a large incident angle with respect to a sample surface and a moderate fringe sensitivity; and an oblique incidence interferometer apparatus using the same.

The present invention provides an oblique incidence interferometer optical system comprising:

a light source for emitting coherent light;

a collimator lens for turning the light into a parallel luminous flux;

a reference standard having an entrance surface on which the luminous flux is incident and a reference plane on which the luminous flux entering from the entrance surface is obliquely incident; and a screen section on which an interference fringe is projected, the interference fringe being formed by a part the luminous flux reflected by a sample surface disposed so as to oppose the reference plane after being emitted from the reference plane and a part of the luminous flux internally reflected by the reference plane;

wherein the entrance surface and reference plane of the reference standard form therebetween an angle set within the range of 10° to 30°.

Preferably, the reference standard comprises an exit surface provided with the screen section.

Preferably, the reference plane and the screen section are formed parallel to each other.

Preferably, the reference plane comprises a prism.

The apparatus in accordance with the present invention comprises the oblique incidence interferometer optical system.

Preferably, the apparatus is configured such that the interference fringe projected on the screen section is viewed with a camera disposed face to face with the exit surface.

Preferably, the apparatus further comprises optical path changing means for changing the incident angle of the luminous flux incident on the entrance surface.

DESCRIPTION OF THE PREFERRED EMBODIMENTS

In the following, embodiments of the present invention will be explained with reference to the drawings.

Figure 1:
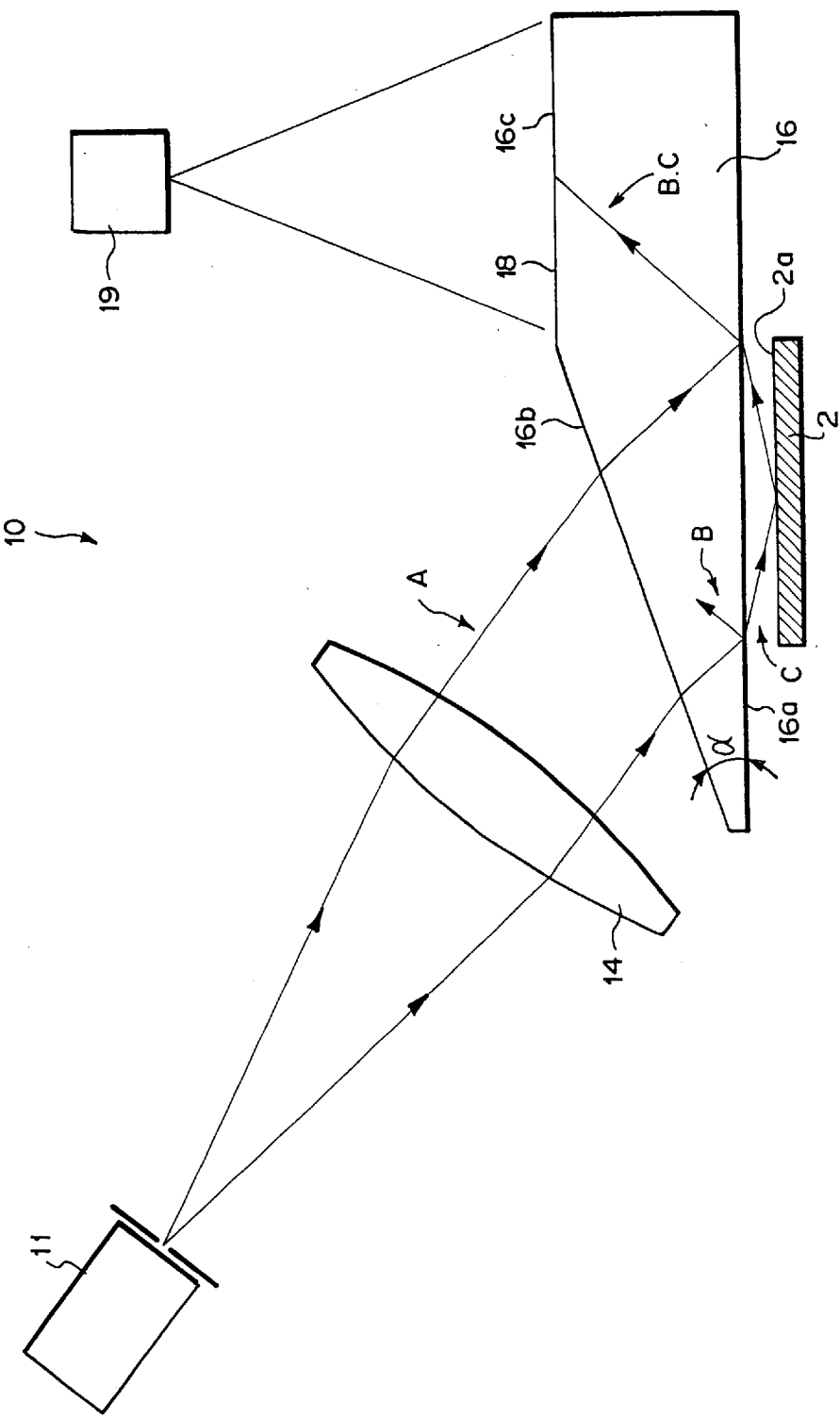
FIG. 1 is a side view showing an oblique incidence interferometer apparatus using an oblique incidence interferometer optical system in accordance with an embodiment of the present invention.

FIG. 1 is a side view showing a planarity measuring apparatus 10 in accordance with an embodiment.

This oblique incidence interferometer apparatus 10 is an apparatus for measuring the surface form of a sample surface 2a of a sample 2 by utilizing interference fringes formed upon interfering actions of light. The apparatus 10 is constituted by an oblique incidence interferometer optical system comprising a semiconductor laser light source 11 for emitting coherent light, a collimator lens 14 for turning this light into a parallel luminous flux, a reference standard 16 made of transparent glass having a reference plane 16a disposed so as to oppose the sample surface 2a, and a screen 18 on which interference fringes are projected; and a TV camera 19.

The reference standard 16 comprises the reference plane 16a, an entrance surface 16b formed so as to yield an acute angle of 10° to 30° (angle $\alpha$) with respect to the reference plane 16a, and an exit surface 16c formed parallel to the reference plane 16a.

The reference standard 16 is disposed such that the reference plane 16a opposes, by way of a slight air space, the sample surface 2a of the sample 2 firmly held on a sample holder which is not depicted. The semiconductor laser light source 11 and collimator lens 14 are arranged such that a coherent luminous flux A which is emitted from the semiconductor laser light source 11 and then is turned into parallel light by the collimator lens 14 is obliquely incident on the entrance surface 16b.

The exit surface 16c is sand-ground, so as to function as the screen 18 randomly reflecting the light incident on the exit surface 16c.

In the planarity measuring apparatus 10 in accordance with this embodiment, of the coherent luminous flux A obliquely incident on the entrance surface 16b, a part becomes a coherent luminous flux B (reference light) internally reflected by the reference plane 16a, whereas the remainder becomes a coherent luminous flux C (object light) which is emitted outside from the reference plane 16a, reflected by the sample surface 2a, and then made incident on the reference plane 16a again. The coherent luminous fluxes B and C partly interfere with each other, whereby interference fringes corresponding to their optical path difference are projected onto the screen 18.

Since imaging means such as the TV camera 19 is disposed above the screen 18 as depicted, the whole image of interference fringes can be viewed and recorded. The screen 18 may also be viewed directly without the imaging means.

Operations and effects of this embodiment will now be explained.

Figure 7A:
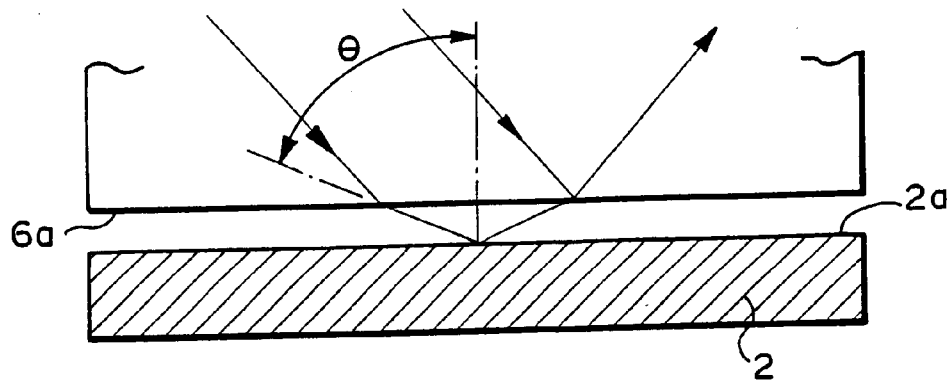
FIG. 7A is a view showing the principle of interference by normal light.
Figure 7B:
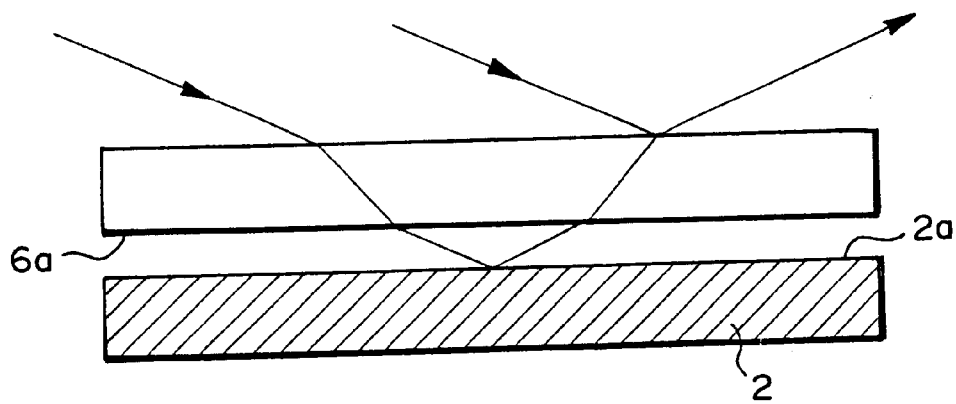
FIGS. 7B and 7C are views showing the principle of abnormal interference which has been problematic in conventional examples.
Figure 7C:
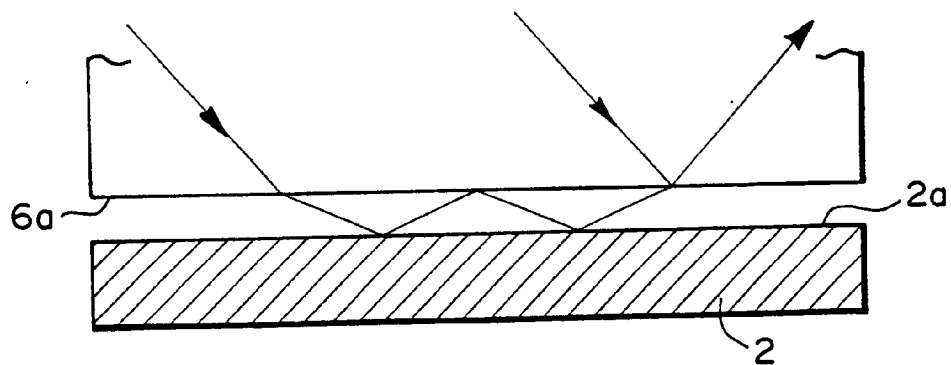

Since the angle ($\alpha$) formed between the entrance surface 16b and reference plane 16a is set within the range of 10° to 30° as in this embodiment, the prism size can be reduced while preventing abnormal interference noise such as that shown in FIGS. 7B and 7C from occurring. Namely, the entrance surface 16b and reference plane 16a form a predetermined angle therebetween, so as to prevent abnormal interference from occurring due to the surface reflection at the entrance surface 16b, and the reference plane 16a has a size which is at least twice as large as the sample surface 2a, so as to eliminate the interference noise caused by multiple reflection light between the sample surface 2a and reference plane 16a. Since the angle $\alpha$ is set within the range of 10° to 30°, the prism can be made smaller and lighter than in the case where a rectangular equilateral triangle prism is used, even when the reference plane 16a is at least twice as large as the sample surface 2a.

When the angle $\alpha$ is set within the range of 10° to 30°, not only the abnormal interference caused by the surface reflection at the entrance surface 16b and the interference noise caused by the multiple reflection light between the sample surface 2a and reference plane 16a are prevented from occurring, but also the noise caused by multiple reflections within the prism can be eliminated.

Figure 3A:
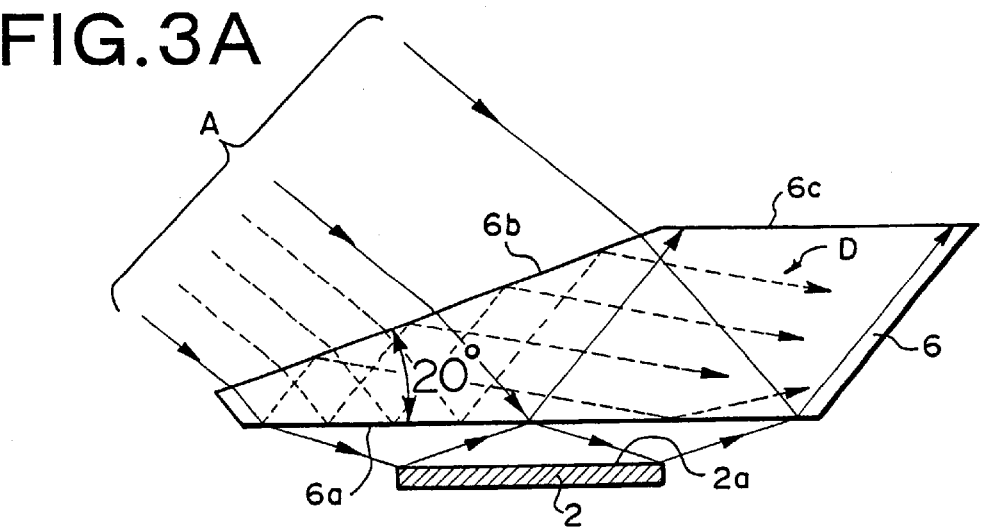
FIGS. 3A to 3C are views for explaining why noise light caused by abnormal reflections upon reciprocation in the oblique incidence interferometer optical system in accordance with an embodiment of the present invention does not reach the exit surface.
Figure 3B:
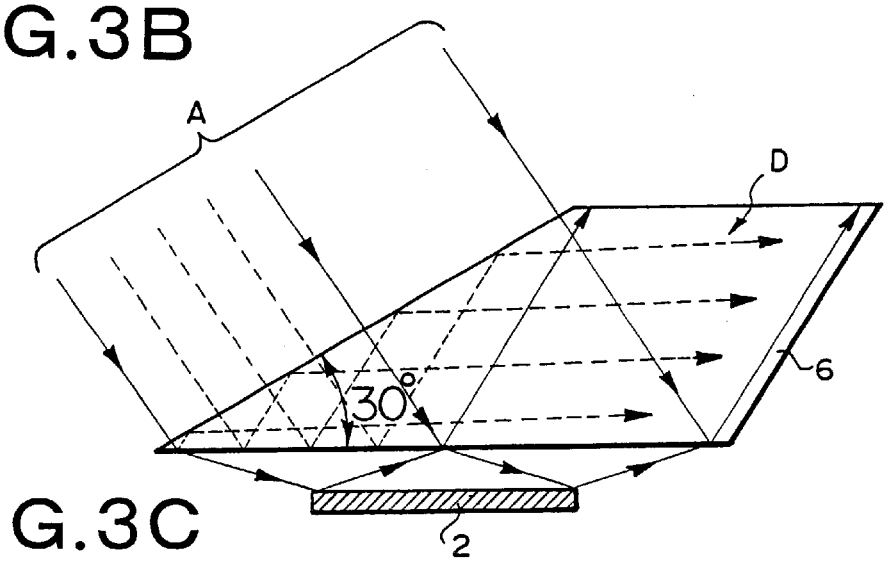
Figure 3C:
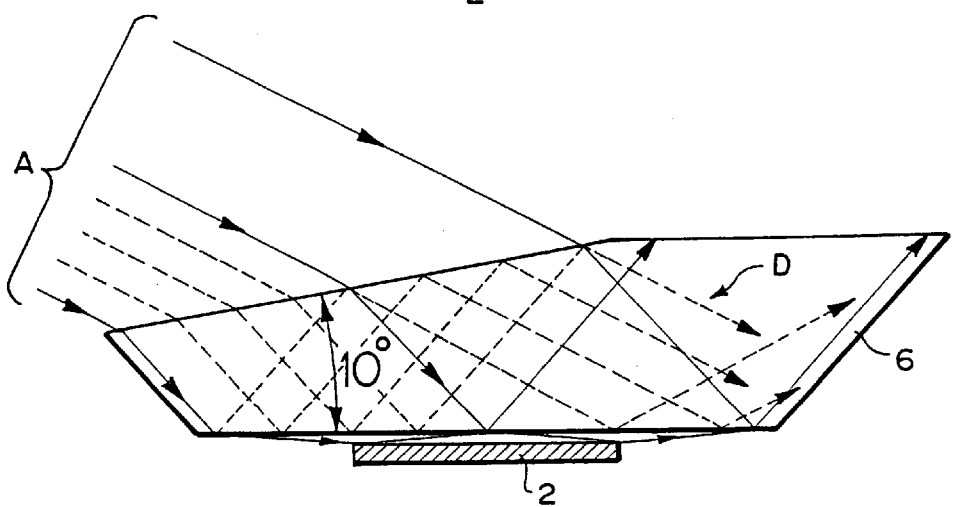

Namely, as shown in FIGS. 3A to 3C, if the angle formed between the entrance surface 6b and reference plane 6a of a prism 6 is set within the range of 10° to 30°, then noise light D reflected by the reference plane 6a into the prism 6 and subsequently reflected by the entrance surface 6b will not exit from the exit surface 6c for interference fringes, whereby it will not adversely affect the viewing of interference fringes. FIGS. 3A, 3B, and 3C indicate the directions of noise light when the angle formed between the entrance surface 6b and reference plane 6a is 20°, 30°, and 10°, respectively.

Figure 4A:
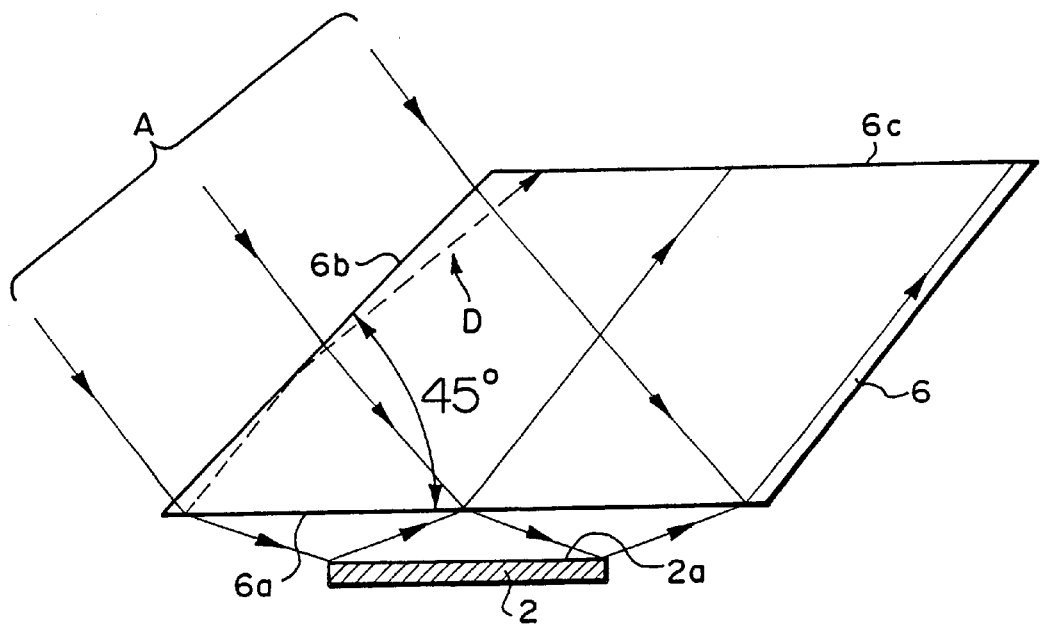
FIGS. 4A and 4B are views for explaining why noise light caused by abnormal reflections upon reciprocation in an oblique incidence interferometer optical system which is out of the range of embodiments of the present invention reaches the exit surface.
Figure 4B:
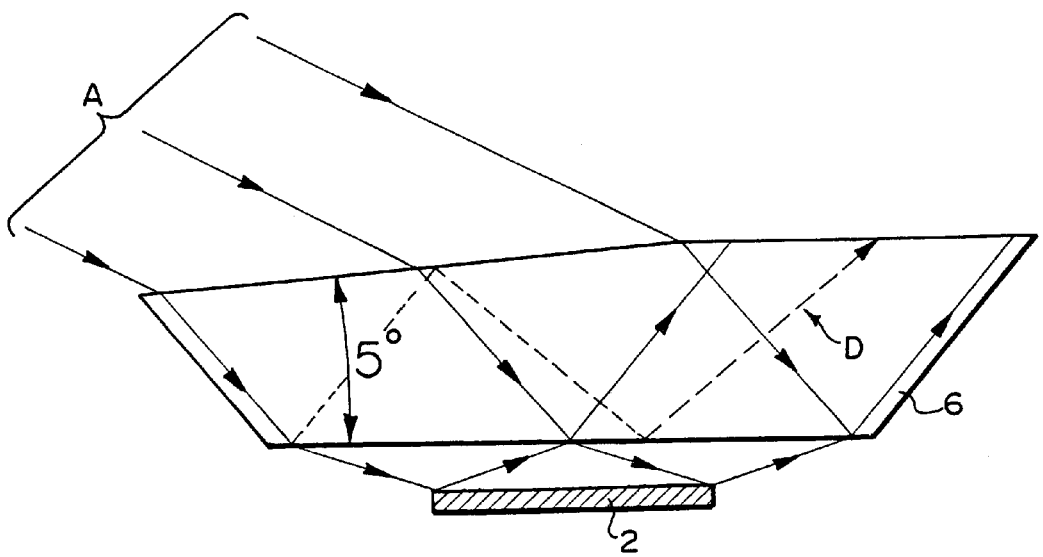
Figure 5:
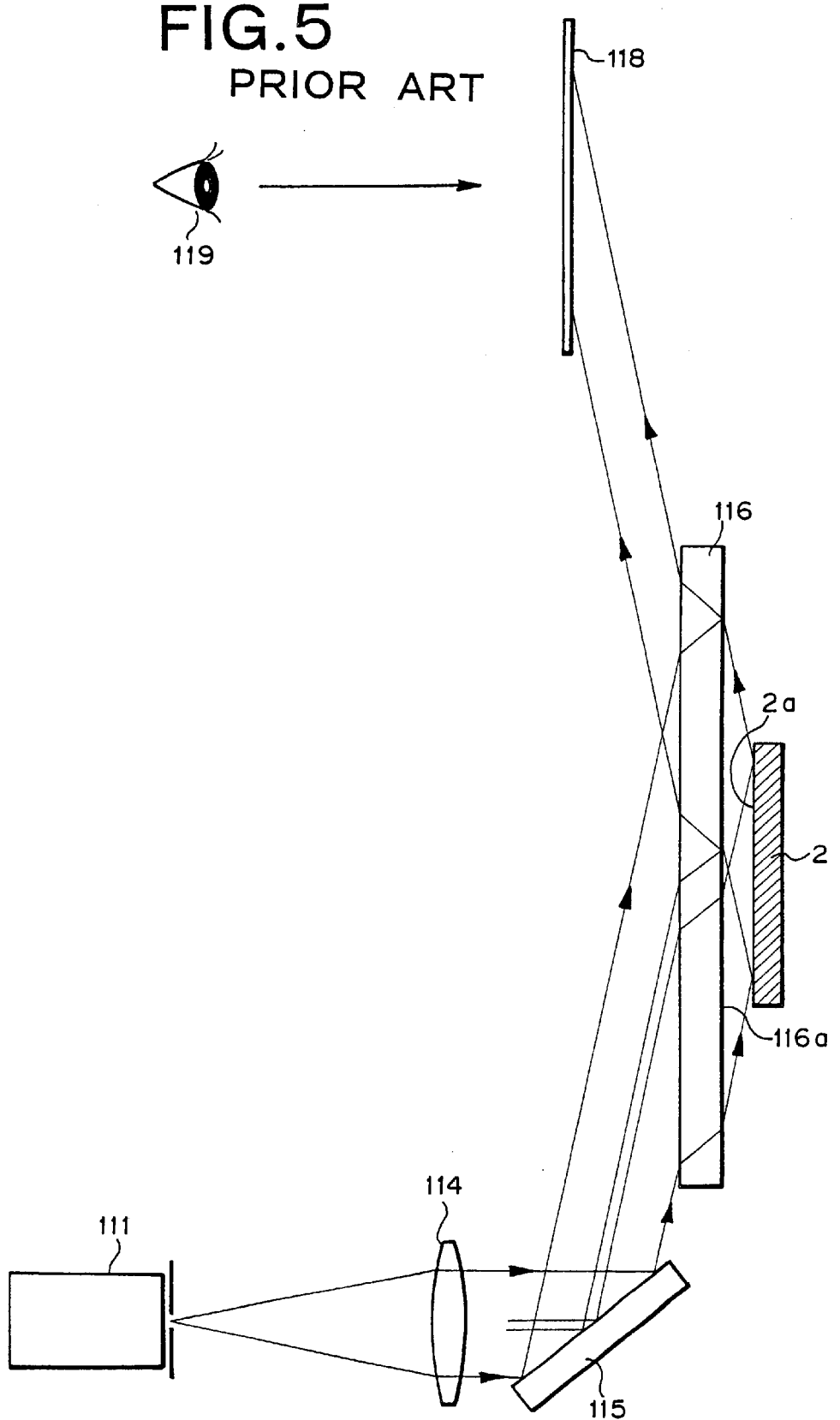
FIG. 5 is a side view showing a conventional example using a plane-parallel plate.
Figure 6:
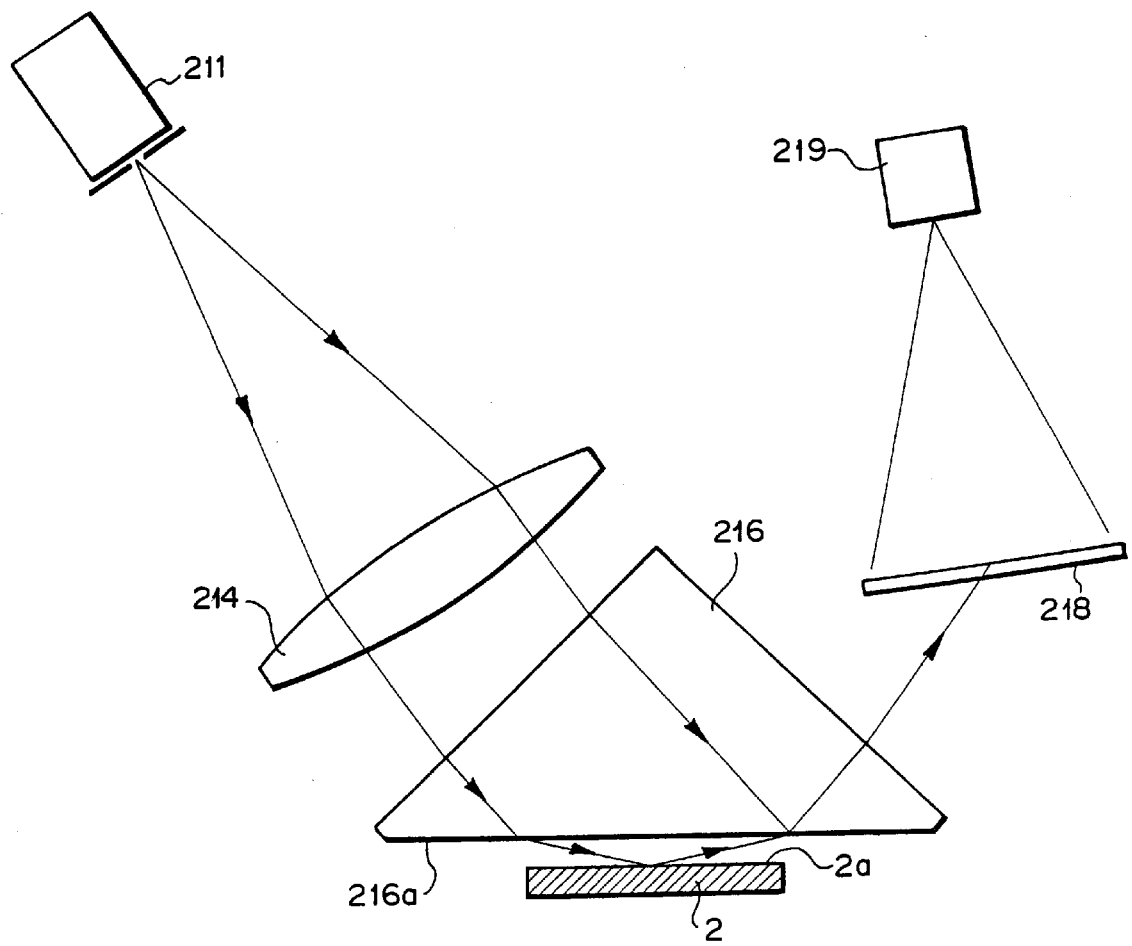
FIG. 6 is a side view showing a conventional example using a regular equilateral triangle prism.

FIGS. 4A and 4B show states of noise light when the angle is outside the range of this embodiment.

FIG. 4A shows the case where the angle is 45°. If the angle exceeds 30° as such, then the noise light D reflected by the entrance surface 6b so as to reach the exit surface 6c after being reflected by the reference plane 6a into the prism 6 is emitted from the exit surface 6c as with interference fringes, whereby there is a fear of the interference fringes being adversely affected by the noise light D when a screen is disposed at the exit surface 6c.

Also, since the reference plane 6a is required to have a size which is at least twice as large as the sample surface 2a, and the entrance surface 6b necessitates a size corresponding to a predetermined incident luminous flux diameter, the prism has a larger size and inevitably a heavier weight if the angle exceeds 30°.

FIG. 4B shows the case where the angle is 5°. If the angle is less than 10° as such, then the noise light D reflected by the entrance surface 6b after being reflected by the reference plane 6a into the prism 6, and subsequently reflected by the reference plane 6a again so as to reach the exit surface 6c is emitted from the exit surface 6c as with interference fringes, whereby there is a fear of the interference fringes being adversely affected by the noise light D when a screen is disposed at the exit surface 6c.

If the angle formed between the entrance surface 16b and reference plane 16a of the prism 16 is set within the range of 10° to 30° while the incident angle with respect to the sample surface 2a is held constant, then the refracting power at the entrance surface 16b can also be made greater than that in the case using a rectangular equilateral triangle prism ($\alpha$=45°). Therefore, the required collimated luminous flux width decreases, so that the collimator lens 14 can be made smaller. As a consequence, the lens and apparatus can be made smaller and lighter.

Since the exit surface 16c is provided with the screen 18, the number of members can be reduced, so as to cut down the cost and save the space. Since the screen 18 and the reference plane 16c are formed parallel to each other, interference fringes can be viewed in a form similar to the sample surface.

Further, if the reference standard 16 is formed as a prism comprising three surfaces, i.e., the entrance surface 16b, reference plane 16a, and exit surface 16c, as in this embodiment, then it is advantageous in that the making is easy and the cost becomes lower.

As a modified example of this embodiment, the oblique incidence interferometer apparatus shown in FIG. 2 will now be explained.

This apparatus has nearly the same configuration as that of the oblique incidence interferometer apparatus shown in the above-mentioned embodiment and can yield operations and effects similar thereto. In FIG. 2, members similar to those in the above-mentioned embodiment are referred to with numerals identical thereto. This apparatus further comprises a mirror 15 disposed between the collimator lens 14 and reference standard 16 in addition to the members of the above-mentioned apparatus. As depicted, the mirror 15 is configured such that its reflecting surface can be rotated by a predetermined angle about its lower end so as to change the incident angle of the luminous flux incident on the entrance surface 16b. When the incident angle is changed as such, the sensitivity for interference fringes can be made variable, whereby the interference fringes can be viewed at a sensitivity suitable for the sample surface.

Figure 2:
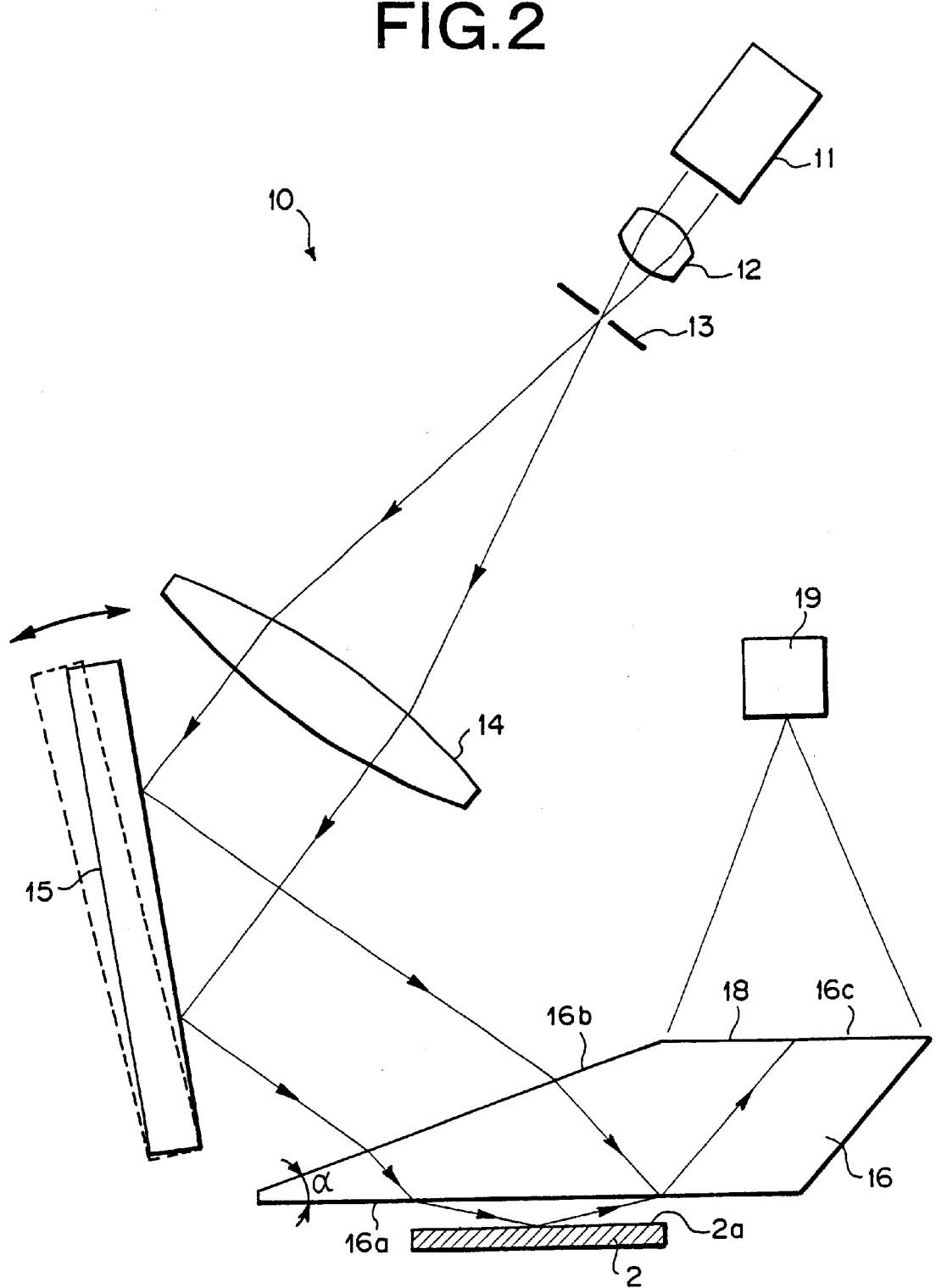
FIG. 2 is a side view showing a modified example of the embodiment shown in FIG. 1.

For yielding a required parallel luminous flux, a condenser lens 12 and a pinhole plate 13 are disposed between the light source 11 and collimator lens 14 in FIG. 2.

This embodiment can be modified in various manners.

For example, though the exit surface 16c is sand-ground so as to form the screen 18 in this embodiment, the screen 18 may also be formed by other roughening techniques.

Further, a screen plate may be disposed on the exit surface 16c. After the exit surface 16c is roughened or while its planarity is kept high, a metal thin film such as aluminum may be formed by a vapor deposition technique (or sputtering technique) by such a thickness as to become semi-transparent.

Instead of forming the screen 18 at the exit surface 16c as in this embodiment, the exit surface 16c may be formed by a smooth surface, and a screen made of a member subjected to light-diffusing processing may be disposed, with a predetermined space from the exit surface 16c, on an optical path of the coherent luminous fluxes B and C emitted from the exit surface 16c.

If the brightness of interference fringes is insufficient, then the above-mentioned screen may be formed by a hologram surface or Fresnel surface having a directivity in the viewing direction.

Though a semiconductor laser light source is used as the light source 11 in this embodiment, any light source can be used as the light source 11 as long as it is a light source emitting a luminous flux having an appropriate coherence. For example, a mercury lamp, LED, and the like may also be used.

As explained in the foregoing, in an oblique incidence interferometer having a large incident angle with respect to a sample surface and a moderate fringe sensitivity, the oblique incidence interferometer optical system in accordance with the present invention sets the angle between the entrance surface and reference plane of the reference standard within a predetermined range, whereby an oblique incidence interferometer optical system which can lower interference noise, reduce the size of optical system, and make the interferometer apparatus lighter and smaller, and an apparatus using the same can be obtained.

What is claimed is:

1. An oblique incidence interferometer optical system comprising:

a light source for emitting coherent light;

a collimator lens for turning said light into a parallel luminous flux;

a reference standard having an entrance surface on which said luminous flux is incident and a reference plane on which said luminous flux entering from said entrance surface is obliquely incident; and a screen section on which an interference fringe is projected, said interference fringe being formed by a part of said luminous flux reflected by a sample surface disposed so as to oppose said reference plane after being emitted from said reference plane and a part of said luminous flux internally reflected by said reference plane;

wherein said entrance surface and reference plane of said reference standard form therebetween an angle set within the range of 10° to 30°.

2. An oblique incidence interferometer optical system according to claim 1, wherein said reference standard comprises an exit surface provided with said screen section.

3. An oblique incidence interferometer optical system according to claim 2, wherein said reference plane and said screen section are formed parallel to each other.

4. An oblique incidence interferometer optical system according to claim 1, wherein said reference plane comprises a prism.

5. An apparatus comprising the oblique incidence interferometer optical system according to claim 1.

6. An apparatus according to claim 2, wherein said interference fringe projected on said screen section is viewed with a camera disposed face to face with said exit surface.

7. An apparatus according to claim 5, further comprising optical path changing means for changing the incident angle of said luminous flux incident on said entrance surface.

* * * * *